United States Patent
Ogi

(10) Patent No.: US 9,061,699 B2
(45) Date of Patent: Jun. 23, 2015

(54) VEHICLE STEERING SYSTEM

(71) Applicant: JTEKT CORPORATION, Osaka-shi, Osaka (JP)

(72) Inventor: Shohei Ogi, Okazaki (JP)

(73) Assignee: JTEKT CORPORATION, Osaka (JP)

( * ) Notice: Subject to any disclaimer, the term of this patent is extended or adjusted under 35 U.S.C. 154(b) by 0 days.

(21) Appl. No.: 14/156,884

(22) Filed: Jan. 16, 2014

(65) Prior Publication Data
US 2014/0209403 A1    Jul. 31, 2014

(30) Foreign Application Priority Data

Jan. 25, 2013    (JP) ................. 2013-012234

(51) Int. Cl.
*B62D 5/04* (2006.01)
*B62D 1/20* (2006.01)
*B62D 5/00* (2006.01)
*B62D 1/16* (2006.01)

(52) U.S. Cl.
CPC ............... *B62D 5/0403* (2013.01); *B62D 1/20* (2013.01); *B62D 5/0436* (2013.01); *B62D 5/003* (2013.01); *B62D 1/16* (2013.01); *B62D 5/04* (2013.01)

(58) Field of Classification Search
CPC .......... B62D 5/003; B62D 5/001; B62D 5/00; B62D 5/0436; B62D 5/0433; B62D 5/043; B62D 5/0439; B62D 5/0478; B62D 1/20; B62D 1/16
USPC ......... 280/777; 74/492, 388 PS; 180/78, 444, 180/443, 400; 701/41
See application file for complete search history.

(56) References Cited

U.S. PATENT DOCUMENTS

| | | | |
|---|---|---|---|
| 2002/0053252 A1* | 5/2002 | Duffy | 74/492 |
| 2009/0190273 A1 | 7/2009 | Moran et al. | |
| 2010/0318264 A1* | 12/2010 | Maeda et al. | 701/42 |
| 2012/0330509 A1 | 12/2012 | Kornhaas et al. | |

FOREIGN PATENT DOCUMENTS

| | | |
|---|---|---|
| GB | 2 231 312 A | 11/1990 |
| JP | A-2008-143483 | 6/2008 |

OTHER PUBLICATIONS

Extended European Search Report issued in Application No. 14151785.4 issued May 16, 2014.

* cited by examiner

*Primary Examiner* — Keith Frisby
(74) *Attorney, Agent, or Firm* — Oliff PLC

(57) ABSTRACT

In a vehicle steering system provided in a vehicle in which a high-voltage battery is provided, a clutch mechanism is mechanically disconnected and the intermediate shaft falls, after a collision of the vehicle is detected. An ECU detects the collision of the vehicle based on an acceleration that is input, and then detects contraction of the column shaft and disconnection of the clutch mechanism based on an ON signal of a microswitch. Thereafter, the ECU is able to continue to rotationally drive an electric motor based on a steering angle signal that is output from a steering angle sensor provided on the column shaft, and that is electrically insulated through a photo coupler, and thus the ECU causes the vehicle to travel and stop.

7 Claims, 3 Drawing Sheets

VEHICLE STEERING SYSTEM

INCORPORATION BY REFERENCE

The disclosure of Japanese Patent Application No. 2013-012234 filed on Jan. 25, 2013, including the specification, drawings and abstract, is incorporated herein by reference in its entirety.

BACKGROUND OF THE INVENTION

1. Field of the Invention

The present invention relates to a vehicle steering system.

2. Description of Related Art

An electric power steering system (EPS) has been widely used, in which a steering assist force is given to a driver's steering effort with the use of an electric motor or the like. In recent years, an electric power steering system has been used in an electrically driven vehicle such as an electric vehicle or a hybrid vehicle, the electrically driven vehicle being provided with an electric storage device such as a secondary battery or a capacitor, and traveling with the use of a drive force generated using electric power stored in the electric storage device. For example, refer to Japanese Patent Application Publication No. 2008-143483 (JP 2008-143483 A).

In such an electrically driven vehicle, electric power may be directly supplied to the electric power steering system with the use of a high-voltage and large-current battery for traveling that is a large-capacity electric storage device. However, when a hybrid vehicle, in which the above-described electric power steering system is provided, has a collision while traveling, it is necessary to stop the supply of electric power to the electric power steering system in order to avoid a situation in which electric shock occurs due to a high voltage, for example, a situation in which a current flows to a driver via a steering mechanism. However, when driving of vehicle wheels is stopped, it is not possible to continue to perform a steering operation, and it may not be possible to cause the vehicle to travel in a limp home mode to evacuate the vehicle. Electric insulation may be achieved using electric control, but when a failure occurs in a control circuit or the like after the collision occurs, it is not possible to completely protect the driver from electric shock.

SUMMARY OF THE INVENTION

An object of the invention is to provide a vehicle steering system that makes it possible to avoid a situation in which a driver receives electric shock, and to continue to provide steering assist so as to safely evacuate a vehicle, when a collision of the vehicle occurs.

A vehicle steering system according to an aspect of the invention includes a high-voltage power source; an electric motor that generates a steering assist force that assists steering of a vehicle; a control device that supplies a drive current to the electric motor and controls rotation of the electric motor; a steering shaft that is connected to a steering portion; a steered mechanism that changes a direction of vehicle wheels; and a connecting portion that connects the steering shaft to the steered mechanism. The connecting portion includes a disconnecting mechanism that mechanically disconnects the steering shaft from the steered mechanism when a collision of the vehicle is detected.

With the above-described configuration, when the vehicle, in which the vehicle steering system using the high-voltage power source, for example, an electric power steering system is provided, has a collision, the steering shaft is mechanically disconnected from the steered mechanism in which the electric motor for providing steering assist is provided, by disconnecting the connecting portion with the use of the disconnecting mechanism. Therefore, it is possible to avoid a situation in which a driver receives electric shock due to a large current flowing from the electric motor via the steered mechanism, and to continue to perform a steering operation without stopping the steering system.

In the vehicle steering system according to the above-described aspect, the connecting portion may be configured to disconnect the steering shaft and the steered mechanism from each other when the steering shaft is contracted in a direction opposite to a direction toward a front side of the vehicle. With the above-described configuration, the steering shaft and the steered mechanism are disconnected from each other in association with the contraction of the steering shaft, which is connected to the steering portion, toward the driver. Therefore, it is possible to avoid a situation in which the driver receives electric shock due to a large current flowing from the electric motor via the steered mechanism.

In the vehicle steering system according to the above-described aspect, after the connecting portion is disconnected, the control device may control the steered mechanism by rotationally driving the electric motor based on a steering angle signal that is output due to steering performed by the steering portion. With the above-described configuration, after the connecting portion is disconnected, the control device continues to control the rotation of the electric motor based on the steering angle signal output from a steering angle sensor provided in a steering unit. Thus, it is possible to continue to perform the steering operation so as to safely move and evacuate the vehicle.

In the vehicle steering system according to the above-described aspect, the steering angle signal may be connected to a control circuit of the control device in a manner such that the steering angle signal is electrically insulated from the control circuit through an insulation circuit. With the above-described configuration, the steering angle signal is electrically insulated from the control circuit. Therefore, it is possible to reduce the possibility that electric shock occurs after a collision occurs, and thus, it is possible to secure the safety of the driver.

With the vehicle steering system according to the above-described aspect, it is possible to avoid the situation in which the driver receives electric shock, and to continue to provide steering assist so as to safely evacuate the vehicle, when a collision of the vehicle occurs.

BRIEF DESCRIPTION OF THE DRAWINGS

The foregoing and further features and advantages of the invention will become apparent from the following description of example embodiments with reference to the accompanying drawings, wherein like numerals are used to represent like elements and wherein.

DETAILED DESCRIPTION OF EMBODIMENTS

Figure 1:
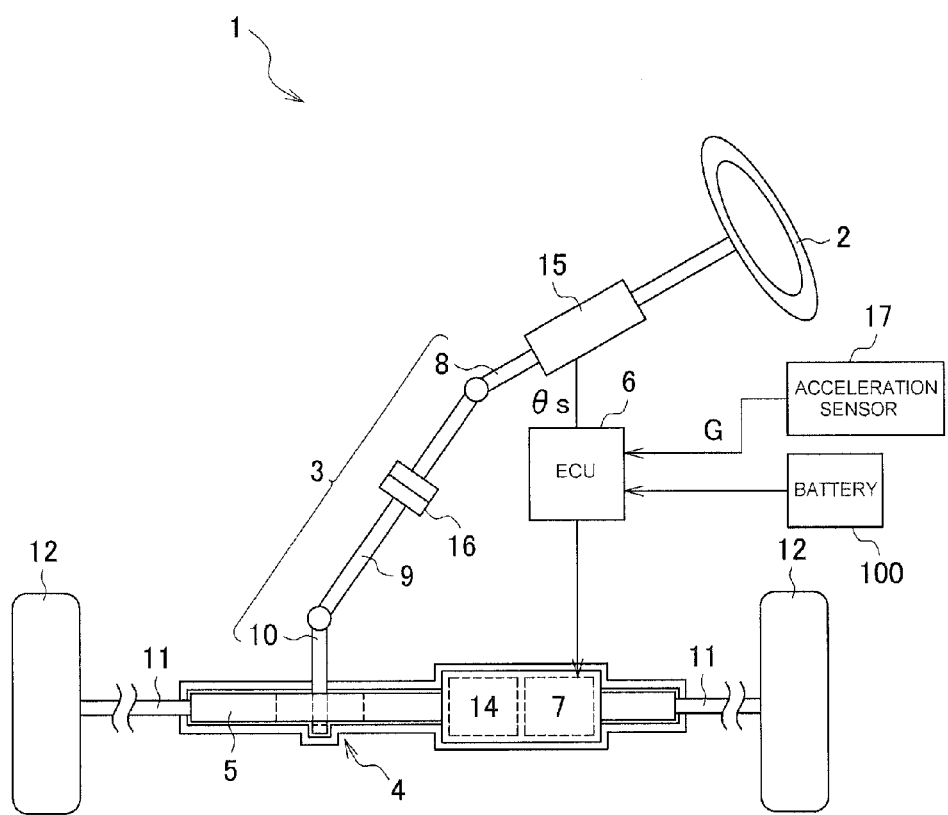
FIG. 1 is a schematic diagram schematically showing a configuration of a vehicle steering system according to an embodiment of the invention.

Hereinafter, a vehicle steering system provided in a vehicle according to an embodiment of the invention will be described with reference to the accompanying drawings. As shown in FIG. 1, in a vehicle steering system 1, a steering shaft assembly 3, to which a steering wheel 2 is fixed, is connected to a rack shaft 5 through a rack and pinion mechanism 4. Accordingly, rotation of the steering shaft assembly 3 due to a steering operation is converted to a reciprocating linear motion of the rack shaft 5 by the rack and pinion mechanism 4. The steering shaft assembly 3 includes a column shaft 8, an intermediate shaft 9, and a pinion shaft 10, which are connected to each other. The column shaft 8 is supported by a steering column 15 through bearings so that the column shaft 8 is rotatable. The steering column 15 is fixed to a vehicle body. A clutch mechanism 16 that is a disconnecting mechanism is disposed at a position at which the intermediate shaft 9 is divided into two parts. The clutch mechanism 16 connects the upper member and the lower member of the intermediate shaft 9 to each other.

The reciprocating linear motion of the rack shaft 5 due to the rotation of the steering shaft assembly 3 is transmitted to knuckles (not shown) through tie rods 11 connected to respective ends of the rack shaft 5 and thus the steering angle of steered wheels 12, that is, the traveling direction of a vehicle is changed. The vehicle steering system 1 according to this embodiment is configured as a so-called rack assist type electric power steering system in which rotation of an assist electric motor 7 is converted to the reciprocating linear motion of the rack shaft 5 by a ball screw mechanism 14 to transmit the reciprocating linear motion, and thus, a motor torque as an assist force is applied to a steering system.

An electronic control unit (ECU) 6 (hereinafter referred to as the ECU 6) is connected to a steering angle sensor (not shown) that is disposed on the steering shaft assembly 3 to constitute a steering angle detector for the steering wheel 2 and an acceleration sensor 17 that detects a lateral acceleration applied to the vehicle. For example, a piezoelectric type accelerometer or a capacitance type accelerometer is used as the acceleration sensor. The steering angle sensor is provided on an intermediate portion of the column shaft 8. The ECU 6 detects a steering angle θs and an acceleration G on the basis of output signals of the sensors.

The ECU 6 is supplied with electric power from an in-vehicle battery 100 (hereinafter, referred to as the battery 100) as a high-voltage power source, and drives the electric motor 7 on the basis of a steering torque, a vehicle speed, and a motor rotation angle. The electric motor 7 generates a steering assist force when the electric motor 7 is rotationally driven by the ECU 6. The ball screw mechanism 14 as a speed reducer is disposed between the electric motor 7 and the rack shaft 5. The steering assist force generated by the electric motor 7 acts to rotate the steering shaft assembly 3 through the ball screw mechanism 14. When a rated voltage of the electric motor 7 is substantially the same as the rated voltage, for example, 600 V, of a battery for traveling used as a main power source of the vehicle, the battery for traveling is connected for driving the electric motor 7. The primary object of the battery for traveling is to supply electric power to a motor for traveling in an electric vehicle or a hybrid vehicle.

The steering shaft assembly 3 rotates due to both the steering torque applied to the steering wheel 2 and the steering assist force generated by the electric motor 7. Thus, the electric power steering system that is the vehicle steering system 1 provides steering assist using the steering assist force generated by the electric motor 7.

Figure 2:
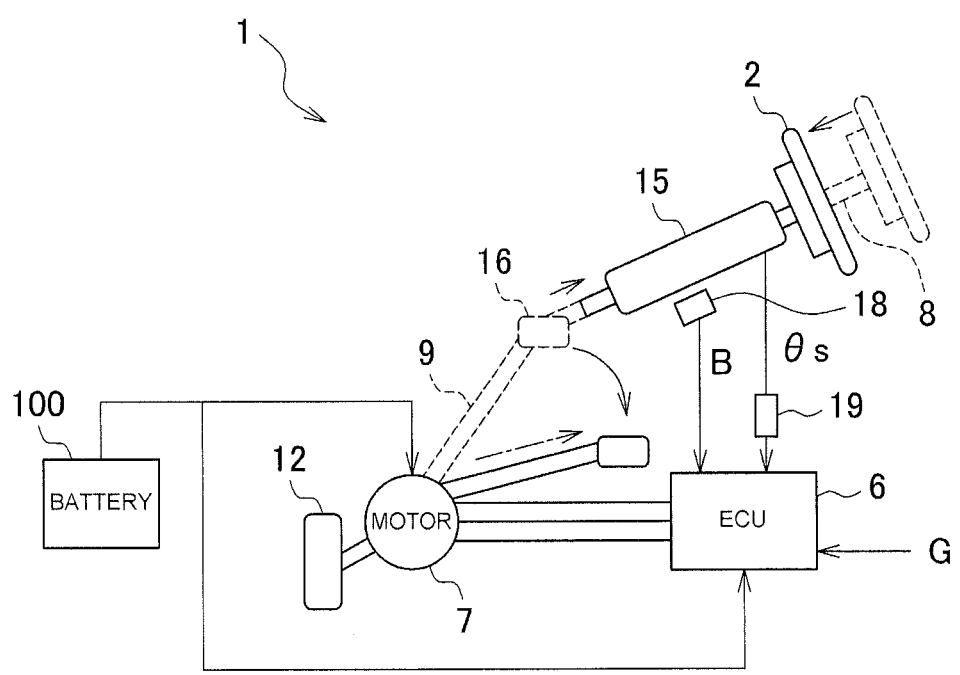
FIG. 2 is a diagram schematically showing a configuration of a main part of the vehicle steering system after a collision is detected.

FIG. 2 is a diagram schematically showing a configuration of a main part of the vehicle steering system after a collision is detected. As shown in FIG. 2, the vehicle steering system 1 includes the electric motor 7 disposed in the rack and pinion mechanism 4 (see FIG. 1), the ECU 6, the battery 100, the clutch mechanism 16 disposed at an intermediate portion of the intermediate shaft 9, the steering column 15 fixed to the column shaft 8, and the steering wheel 2 fixed to the column shaft 8.

Signals, such as a signal indicating the acceleration G, a signal indicating the steering angle θs, and a signal B indicating whether the clutch mechanism 16 is in a connected state or a disconnected state, are input to the ECU 6. A steering angle signal output from the steering angle sensor disposed on the column shaft 8 is electrically insulated from a control circuit through a photo coupler (insulation circuit) 19. The ECU 6 computes the steering angle θs on the basis of the steering angle signal. The steering column 15 is provided with a clutch disconnection sensor 18 that detects disconnection of the clutch mechanism 16 and outputs the signal B indicating whether the clutch mechanism 16 is in the connected state or the disconnected state. The clutch disconnection sensor 18 is constituted by a microswitch with a hinge lever, and the like.

It is detected whether a collision of the vehicle occurs on the basis of the acceleration G, and when the collision of the vehicle occurs, the clutch mechanism 16 is disconnected. For example, the clutch mechanism 16 is constituted by an electromagnetic clutch and the clutch mechanism 16 can be disconnected by switching a state of power supply to the electromagnetic clutch. When the collision of the vehicle occurs, the steering column 15 is moved toward the front side of the vehicle due to an inertial force. At this time, the column shaft 8 is contracted toward the rear side of the vehicle by an operation of a shock absorbing mechanism (not shown). The clutch disconnection sensor 18 is disposed at a position at which a switch in the clutch disconnection sensor 18 is turned on by interference of the column shaft 8 and the clutch disconnection sensor 18 due to the movement of the steering column 15 toward the front side of the vehicle and the contraction of the column shaft 8 toward the rear side of the vehicle.

With the above-described configuration, the steering column 15 is moved toward the front side of the vehicle and the column shaft 8 is contracted after the collision of the vehicle occurs. The clutch mechanism 16 is pulled toward the rear side of the vehicle in association with the movement of the column. Accordingly, the clutch mechanism 16 is mechanically disconnected, and thus, the intermediate shaft 9 is separated into the upper member and the lower member. As a result, when a failure occurs in the control circuit of the ECU 6 or when an earth fault of the battery 100 occurs, a large current flowing from the battery 100 via the electric motor 7 is interrupted by the intermediate shaft 9 and the clutch mechanism 16. Since the steering angle sensor and the ECU 6 are insulated from each other, a current does not flow from the control circuit of the ECU 6 to the steering column 15.

Figure 3:
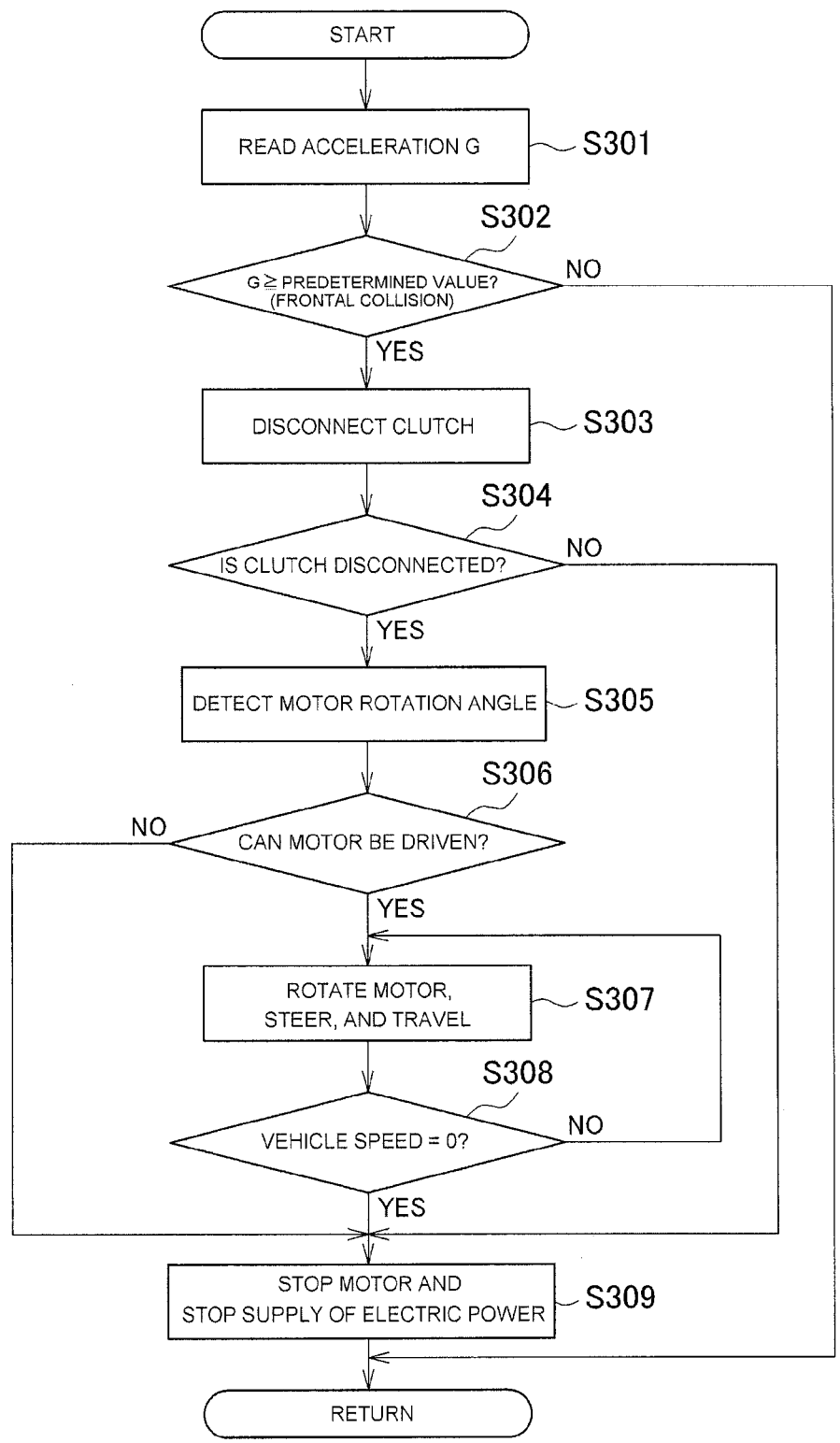
FIG. 3 is a flowchart showing a procedure of processing performed by a control circuit of a control device when a collision of a vehicle occurs.

FIG. 3 is a flowchart showing a procedure of processing performed by the control circuit of the ECU when a collision of the vehicle occurs. In this embodiment, the ECU 6 performs the processes in steps S301 to S309 shown in the flowchart of FIG. 3. The processing in the flowchart described below is performed at predetermined time intervals.

With reference to FIG. 3, the CPU of the control circuit of the ECU 6 acquires the acceleration G detected by the acceleration sensor 17 (step S301). Then, the CPU determines whether the detected acceleration G is equal to or larger than a predetermined value (step S302). When the detected acceleration G has a direction opposite to the traveling direction, it is determined that the collision is a frontal collision. When the acceleration G is equal to or larger than the predetermined value (YES in step S302), it is determined that the collision of the vehicle occurs and the processing proceeds to step S303. In step S303, the clutch mechanism 16 is disconnected. When the acceleration G is smaller than the predetermined value (NO in step S302), the processing ends and exits the processing flow.

Subsequently, it is determined whether the clutch mechanism 16 is normally disconnected (step S304). The CPU determines whether the clutch disconnection sensor 18 is in the ON state or in the OFF state, and when the microswitch (the clutch disconnection sensor) 18 is continuously in the ON state for a predetermined time (YES in step S304), the processing proceeds to step S305. In step S305, the CPU detects the state of the assist electric motor 7. When the microswitch 18 is not turned on (NO in step S304), the processing proceeds to step S309. In step S309, the CPU stops the supply of electric power to the electric motor 7.

The amount of change in a rotational position (motor rotation angle θm) of a rotor is detected with the use of the rotation angle sensor disposed on a rotary shaft of the electric motor 7 (step S305) and it is determined whether the electric motor 7 is able to be rotationally driven (step S306). When the amount of change in the motor rotation angle θm is not zero (YES in step S306), the CPU determines that the motor is able to be rotationally driven, and continues to perform the steering operation and continues to cause the vehicle to travel. When the amount of change in the motor rotation angle θm is zero (NO in step S306), the CPU determines that the steering operation is not able to be performed and the processing proceeds to step S309. In step S309, the CPU stops the supply of electric power to the electric motor 7.

Then, it is determined whether the vehicle stops traveling after the steering operation is performed (step S308). When the vehicle speed is not zero (NO in step S308), that is, when the vehicle is traveling, the processing proceeds to step S307. When the vehicle speed is zero (YES in step S308), that is, when the vehicle stops, the CPU turns off the power source to stop the supply of electric power to the motor (step S309). Then, the processing ends and exits the processing flow.

The steering operation in step S307 is an operation under so-called steer-by-wire control in which the steering wheel is not mechanically connected to a steered mechanism. In this steering operation, a motor drive current command value im is determined by computation based on the steering angle θs of the steering wheel 2. By multiplying the steering angle θs of the steering wheel 2 by a coefficient Gm determined based on a reduction ratio of the steering mechanism and transmission efficiency, the motor rotation angle θm (=Gm×θs) is computed, and thus, a motor revolution number (i.e., the number of revolutions of the electric motor 7) Nm (=θm/2π) is computed. In this case, 7 represents the circular constant. A motor torque Tm corresponding to the motor revolution number Nm is calculated on the basis of the number of revolutions-torque characteristics of the electric motor 7, and the motor torque Tm is divided by a motor constant Kt to determine the motor drive current command value im (=Tm/Kt).

Operations and advantageous effects of the vehicle steering system 1 having the above-described configuration according to this embodiment will be described below.

In the above-described configuration, the vehicle steering system 1 includes the electric motor 7 disposed in the rack and pinion mechanism 4, the ECU 6, the battery 100, the clutch mechanism 16 disposed at the intermediate portion of the intermediate shaft 9, the steering column 15 fixed to the column shaft 8, and the steering wheel 2 fixed to the column shaft 8. When the vehicle, in which the vehicle steering system 1 using the battery 100 that is a high-voltage power source is provided, has a collision, the clutch mechanism 16 is disconnected. The steering column 15 is moved toward the front side of the vehicle due to the collision of the vehicle, and the column shaft 8 is contracted by the operation of the shock absorbing mechanism. The clutch mechanism 16 disposed at the intermediate portion of the intermediate shaft 9 is pulled toward the rear side of the vehicle in association with the collision contraction operation of the column. Accordingly, the clutch mechanism 16 is mechanically disconnected, and thus, the intermediate shaft 9 is separated into the upper member and the lower member, and the lower member falls. The ECU 6 detects the collision of the vehicle on the basis of the output of the acceleration sensor 17, and detects the contraction of the column shaft 8 and the mechanical disconnection of the clutch mechanism 16 on the basis of the ON signal of the microswitch 18. Thereafter, the ECU 6 is able to continue to rotationally drive the electric motor 7 on the basis of the steering angle signal that is output from the steering angle sensor provided on the column shaft 8, and that is electrically insulated through the photo coupler 19, and thus the ECU 6 is able to cause the vehicle to travel and stop.

With the above-described configuration, when a failure occurs in the control circuit of the ECU 6 or an earth fault of the battery 100 occurs after the collision of the vehicle occurs, a large current flowing from the battery 100 via the electric motor 7 is interrupted by the clutch mechanism 16, and thus, an insulated state is secured. Since the steering angle sensor and the ECU 6 are insulated from each other, a current does not flow from the control circuit of the ECU 6 to the steering column 15. As a result, when the electric vehicle, in which the vehicle steering system 1 using a high-voltage power source is provided, has a collision while traveling, it is possible to avoid a situation in which a driver receives electric shock, and to continue to perform the steering operation without stopping the steering assist of the vehicle steering system 1, so as to move and evacuate the vehicle.

While the embodiment of the invention is described above, the invention may be implemented in other embodiments.

In the above-described embodiment, the intermediate shaft 9 is separated into two parts to disconnect the clutch mechanism 16 disposed at the intermediate portion of the intermediate shaft 9 after the collision of the vehicle is detected. However, the portion to be disconnected is not limited to the intermediate shaft 9 and another portion may be disconnected as long as it is in an electric shock path in which an insulated state is achieved.

In the above-described embodiment, the collision of the vehicle is detected with the use of the acceleration sensor 17 provided in the vehicle. However, the invention is not limited to this configuration. For example, the collision may be detected on the basis of an operation of an airbag, or another method using a collision detection signal may be used to detect the collision.

In the above-described embodiment, a so-called rack assist type electric power steering system or a pinion assist type electric power steering system is employed as the electric power steering system, and the intermediate shaft 9 is disconnected. However, the invention is not limited to this configuration and may be applied to a column assist type electric power steering system, and a column portion may be disconnected.

What is claimed is:
1. A vehicle steering system, comprising:
a power source configured to be used as a main power source of a vehicle;

an electric motor that generates a steering assist force that assists steering of the vehicle, the power source being configured to drive the electric motor;

a controller that supplies a drive current to the electric motor and controls rotation of the electric motor, the controller being configured to determine when a collision of the vehicle has occurred;

a steering shaft that is connected to a steering portion;

a steered mechanism that changes a direction of vehicle wheels; and a connecting portion that connects the steering shaft to the steered mechanism, wherein the control is configured to mechanically disconnect the steering shaft from the steered mechanism when the controller determines that the collision of the vehicle has occurred.

2. The vehicle steering system according to claim 1, wherein the connecting portion disconnects the steering shaft and the steered mechanism from each other when the steering shaft is contracted in a direction opposite to a direction toward a front side of the vehicle.

3. The vehicle steering system according to claim 2, wherein after the connecting portion is disconnected, the controller controls the steered mechanism by rotationally driving the electric motor based on a steering angle signal that is output due to steering performed by the steering portion.

4. The vehicle steering system according to claim 1, wherein when (i) the controller determines that the collision of the vehicle has occurred and (ii) the connecting portion is disconnected, the controller controls the steered mechanism by rotationally driving the electric motor based on a steering angle signal that is output due to steering performed by the steering portion.

5. The vehicle steering system according to claim 4, wherein the steering angle signal is connected to the controller in a manner such that the steering angle signal is electrically insulated from the controller through an insulation circuit.

6. The vehicle steering system according to claim 1, wherein, after the controller determines that the collision of the vehicle has occurred, the controller is configured to determine if the connecting portion is disconnected.

7. The vehicle steering system according to claim 6, wherein, when the controller determines that the connecting portion is not disconnected after the controller determines that the collision of the vehicle has occurred, the controller stops a supply of electric power to the electric motor.

* * * * *